United States Patent [19]
Casalegno

[11] Patent Number: 5,327,122
[45] Date of Patent: Jul. 5, 1994

[54] INSTALLATION FOR DATA TRANSMISSION WITH CORRECTION OF PHASE ERROR

[76] Inventor: Massimo Casalegno, Frankfurter Landstrasse 5, D-6370 Oberursel/Ts, Italy

[21] Appl. No.: 758,104

[22] Filed: Sep. 12, 1991

Related U.S. Application Data

[63] Continuation-in-part of Ser. No. 572,546, Aug. 27, 1990, abandoned.

[30] Foreign Application Priority Data

Sep. 4, 1989 [CH] Switzerland ............ 03195/89

[51] Int. Cl.$^5$ .................................. H04B 1/59
[52] U.S. Cl. ........................ 340/825.7; 340/825.54
[58] Field of Search ......... 340/825.54, 825.7, 870.18, 340/870.25; 370/21, 122; 375/78, 79, 80, 83, 52; 342/44, 51

[56] References Cited

U.S. PATENT DOCUMENTS

| | | |
|---|---|---|
| 3,697,881 | 10/1972 | Nakagome et al. . |
| 3,984,835 | 10/1976 | Kaplan et al. . |
| 4,061,977 | 12/1977 | Motley et al. . |
| 4,087,628 | 5/1978 | Sanders et al. . |
| 4,359,692 | 11/1982 | Ryan . |
| 4,654,658 | 3/1987 | Walton . |
| 4,899,158 | 2/1990 | Saeki et al. . |
| 4,928,087 | 5/1990 | Kreft et al. ............ 340/825.54 |
| 4,931,788 | 6/1990 | Creswick ............ 340/825.54 |
| 5,095,309 | 3/1992 | Troyk et al. ............ 340/825.7 |
| 5,153,583 | 10/1992 | Murdoch ............ 340/825.54 |

FOREIGN PATENT DOCUMENTS 8803687  5/1989  PCT Int'l Appl. .
2164825  3/1986  United Kingdom .

*Primary Examiner*—Donald J. Yusko
*Assistant Examiner*—John Giust
*Attorney, Agent, or Firm*—Richard Linn

[57] ABSTRACT

The apparatus embodies an inquiry unit with a radio frequency emitter and an answering unit (transponder) with a frequency divider for the frequency of the emitter of the inquiry unit. The divided frequency is modulated with the data inside the transponder as a carrier frequency in a phase modulator for the transmission of the answer and the so modulated signal is delivered to a demodulator of the inquiry unit. In the demodulator, the original data sequence is recovered from the received phase modulated signal with the help of an unmodulated reference signal derived from the frequency transmitted by the inquiry unit itself, using an algorithm implemented by means of a digital signal processor, independently of the phase relationship between the phase modulated signal and the internal reference and with negligible delay.

9 Claims, 3 Drawing Sheets

INSTALLATION FOR DATA TRANSMISSION WITH CORRECTION OF PHASE ERROR

CROSS-REFERENCES TO RELATED APPLICATIONS

This is a continuation-in-part of applicant's copending U.S. Pat. application, Ser. No. 07/572,546, filed Aug. 27, 1990, now abandoned.

BACKGROUND OF THE INVENTION

The present invention relates to an apparatus for data transmission which comprises an inquiry unit in the form of an emitter-receiver and a transponder arranged as a receiver-emitter, the transmission of data taking place at least in one direction by means of a phase modulated emitter, and a phase modulator and wherein the phase demodulator comprises an input for the phase modulated signal and for an unmodulated signal of reference. Such installations serve more specially for so called identification systems wherein the inquiry unit excites the transponder to deliver and transmit a coded answer and wherein the answering code is evaluated in the inquiry unit in order to determine the identity of the answering unit, or of an object associated with the answering unit or the authenticity or authorization of this object or a person. Between the inquiry unit and the transponder there usually exists a wireless transmission, whereby high frequency coils are provided as antennas, said coils serving at the same time as emitting and receiving antennas. Preferably, the transmission of data takes place by means of a phase modulated high frequency signal in order to achieve to the extent possible an undisturbed transmission.

The GB-A-2,164,825 described an identification system of the above mentioned sort. The emitting frequency of the inquiry unit is divided by two in the transponder and the answer is transmitted with half the emitting frequency to the inquiry unit. The emitting frequency is also divided by two in the inquiry unit and this half emitting frequency id delivered to a phase demodulator as a frequency of reference. Under these circumstances, only insignificant problems exist with respect to the position of the phase of this frequency of reference and of the answering signal, because the position of the phase of the unmodulated signals amounts either to 0° or 180°. However, it is desired to select a great distance between both transmission frequencies, that is that these frequencies should differ from each other by a factor of about 4 to 10. Under these circumstances there does not exist a clearly defined position of the phase between the signal of reference and the answering signal which gives rise to particular problems. Moreover, the known system works with two coils each of which however enables operation with a dividing ratio of 2 but hinders a miniaturization.

SUMMARY OF THE INVENTION

It is an object of the present invention to achieve a demodulation practically without time losses for any ratio between the inquiring frequency and the received answering frequency. Unnecessary losses of time must be avoided for two reasons. The permitted transmission frequencies lie under 150 kHz in Europe (400 kHz in the US), so that the answering frequency turns out to have a particularly low value. This leads to a limited transmission speed because of the small bandwidth at disposal and the relatively high noise level in the VLF band. Moreover, the energy in the transponder is in most cases limited, either because this energy is taken from the inquiry signal or because the transponder must be fed by relatively small batteries, due to the fact that the transponder must be very small. In order to solve this problem, the installation according to the invention is characterized in that an algorithm, implemented by means of a signal processor, directly recovers the original data sequence contained in the transponder from the received signal, independently from its phase relationship with the internal reference.

BRIEF DESCRIPTION OF THE DRAWINGS

The invention will be described further by means of an example of execution with reference to the drawings in which.

BRIEF DESCRIPTION OF THE PREFERRED EMBODIMENT

Figure 1:
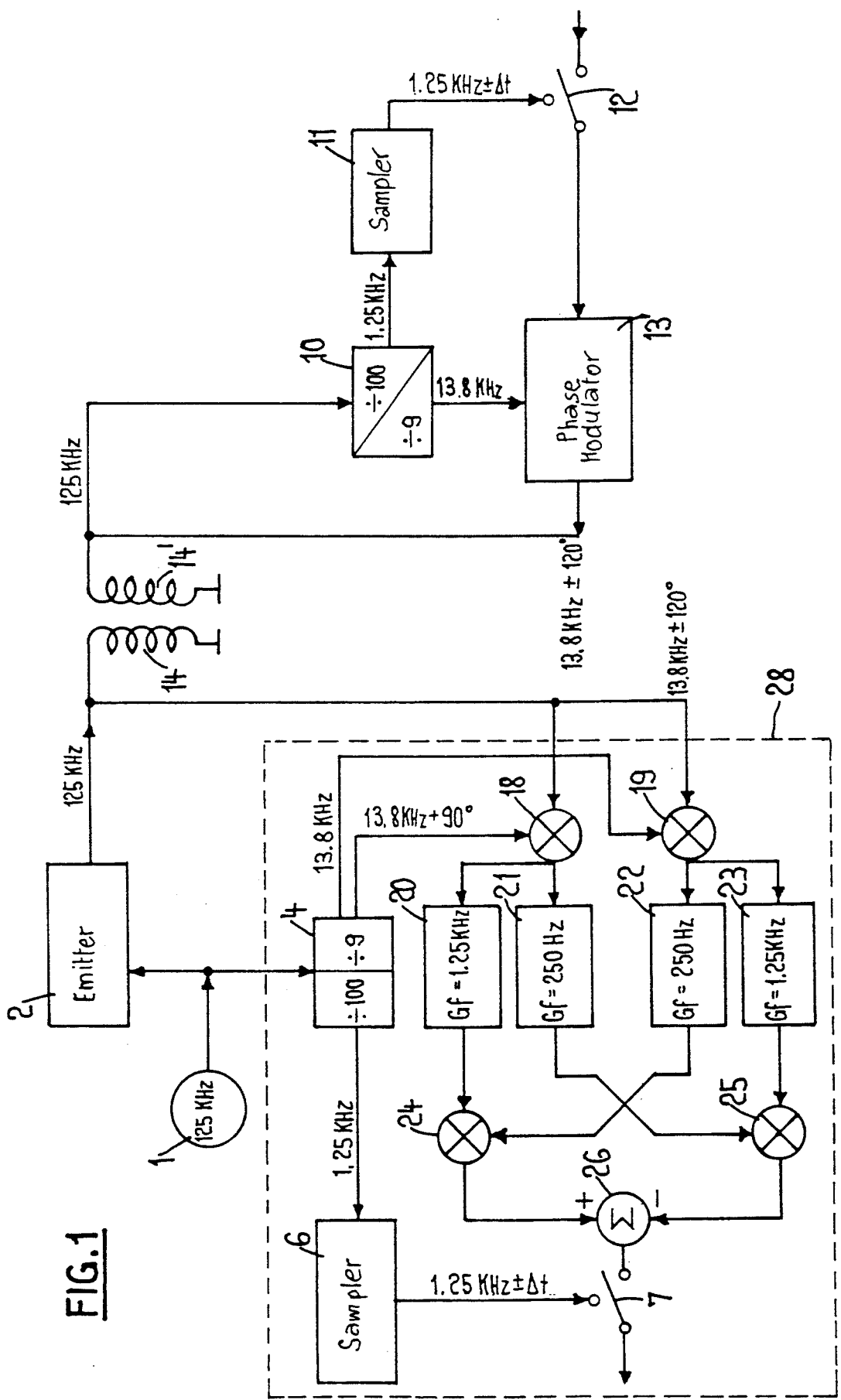
FIG. 1 is a block diagram of a preferred embodiment of the invention.

In FIG. 1, the inquiry unit is schematically illustrated on the left side and the transponder on the right side. The inquiry unit comprises an oscillator 1, its frequency having an admissible value of e.g. 125 kHz and being delivered to an emitter 2 as well as to a divider 4. All other frequencies are derived from it and, in the case of the example, for the sake of clarity are indicated in FIG. 1.

The transponder comprises a frequency divider 10, which extracts its clock from the inquiry signal sent by the emitter 2. The connection between the emitter 2 and the divider 10 takes place wirelessly by means of an emitting coil 14 and a receiving coil 14', the inquiry unit and the transponder possessing only one coil 14, 14', each, (or another kind of aerial in its place) which serves as an emitting as well as a receiving antenna. The inquiry signal is divided by 100, e.g., to generate a control signal for the sampler 11 and by 9, e.g., to obtain a carrier for the phase modulator 13. The sampler 11 controls a switching element 12 for feeding the data to be transmitted to the phase modulator 13. The divided output frequency of e.g. 13.8 kHz from the divider 10 is fed into the modulator 13 as a carrier frequency and transmitted back to the phase demodulator 18 to 26 through the same channel (wireless connection).

The demodulation in the inquiry unit takes place in accordance with FIG. 1 by means of the formulas for axis rotation:

$$X = +x\cos\mu + y\sin\mu$$

$$Y = -x\sin\mu + y\cos\mu$$

With respect to the invention, x and y signify the raw real and the raw imaginary component of the phase modulation of the received signal, i.e., the phase in relation to the signal of the reference oscillator 1 divided by divider 4 which is shifted by the angle u with respect to the carrier of the phase modulator 13 generated in the transponder. The magnitudes X and Y signify the real and imaginary components of the phase modulation, i.e., the phase modulation generated by the phase modulator 13.

In one embodiment only the result of the second formula is calculated. This corresponds to the projection of the phase modulated signal on the rotated imaginary axis, which in turn is proportional to the modulation carried by the signal. The frequency divider 4 not only divides the oscillator frequency but it also delivers at its outputs two signals with a phase difference of 90° to one another, i.e. sine and cosine. These signals are passed each on an input of a multiplier 18 and 19. The second inputs of these multipliers are fed with the received answering signal from the modulator 13 of the transponder. Two differently dimensioned low pass filters 20 and 21 or 22 and 23, are connected with the outputs of each multiplier 18 and 19, respectively. One of these low pass filters having a higher cut off frequency and the other a lower cut off frequency. The outputs of each one of a pair of low pass filters 20, 22 and 23, 21 are connected with the inputs of each one of the multipliers 24 and 25, whereby from each pair the low pass filter having the lower cut off frequency is associated with a multiplicator 19 respectively 18 and the other low pass filter having the higher cut off frequency is associated with the other multiplier 18 respectively 19. The outputs of the multipliers 24 and 25 are connected with the inputs of a subtractor 26, which calculates the difference between the output signal of the multiplier 24 and the output signal of the multiplier 25. Sampler 6 and switch 7 evaluate the output signal of subtractor 26 in correspondence to sampler 11 and switch 12 of the transponder, which yields the transferred data sequence. Due to the fact that the carrier has a modulation amplitude limited to 120°, a signal in accordance with and proportional to the formula $Y = -x \sin \mu + y \cos \mu$ is reconstructed and delivered to the data output. This is possible because as a consequence of the limited angle a residual carrier is present in the modulated signal, thus the outputs of the averaging filters 21 and 22 are proportional to the phase components sin u and cos u. FIG. 1 shows an example of how the different frequencies and cut off frequencies may be chosen in order to achieve the desired averaging filters 21 and 22, and noise filters 20 and 23.

Figure 2:
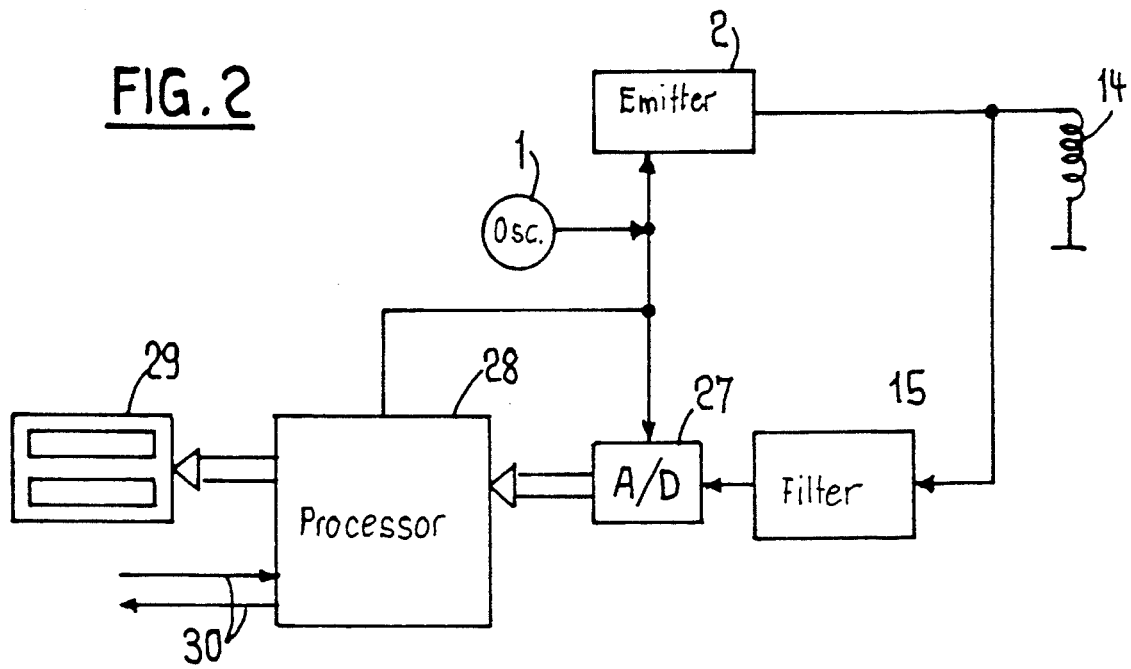
FIG. 2 shows a block diagram of another preferred embodiment of the present invention.

The demodulator can be realized in accordance with FIG. 2 by means of a digital signal processor. In this case, the emitter 2 is connected with an antenna in form of a coil 14. The answering signal is delivered to a prefilter 15, the output of which is connected to an analog to digital converter 27. The outputs of this converter are connected with the inputs of a digital signal processor 28, in the present example of the type TMS 320 C 25, whose clock frequency is synchronous with the output signal of the oscillator 1. A display unit 29 is also connected to the processor 28 in order to visualize the decoded data. A serial data communication channel 30 may also be provided.

The multipliers 18 and 19 are realized as follows:

Because the sampling rate of the input from the A/D converter 27 is not necessarily a whole number ratio between the carrier frequency to be demodulated and the sampling rate of the following evaluation process 6, 7 (e.g. f4/f7 = 11.11111... periodically, that is, a ratio greater than one), and in spite of this fact a high precision is necessary in order to achieve a noiseless demodulation, the multiplications 18, 19 are executed in this case by means of displaceable look-up-tables 34,35 of sine and cosine values.

Figure 3:
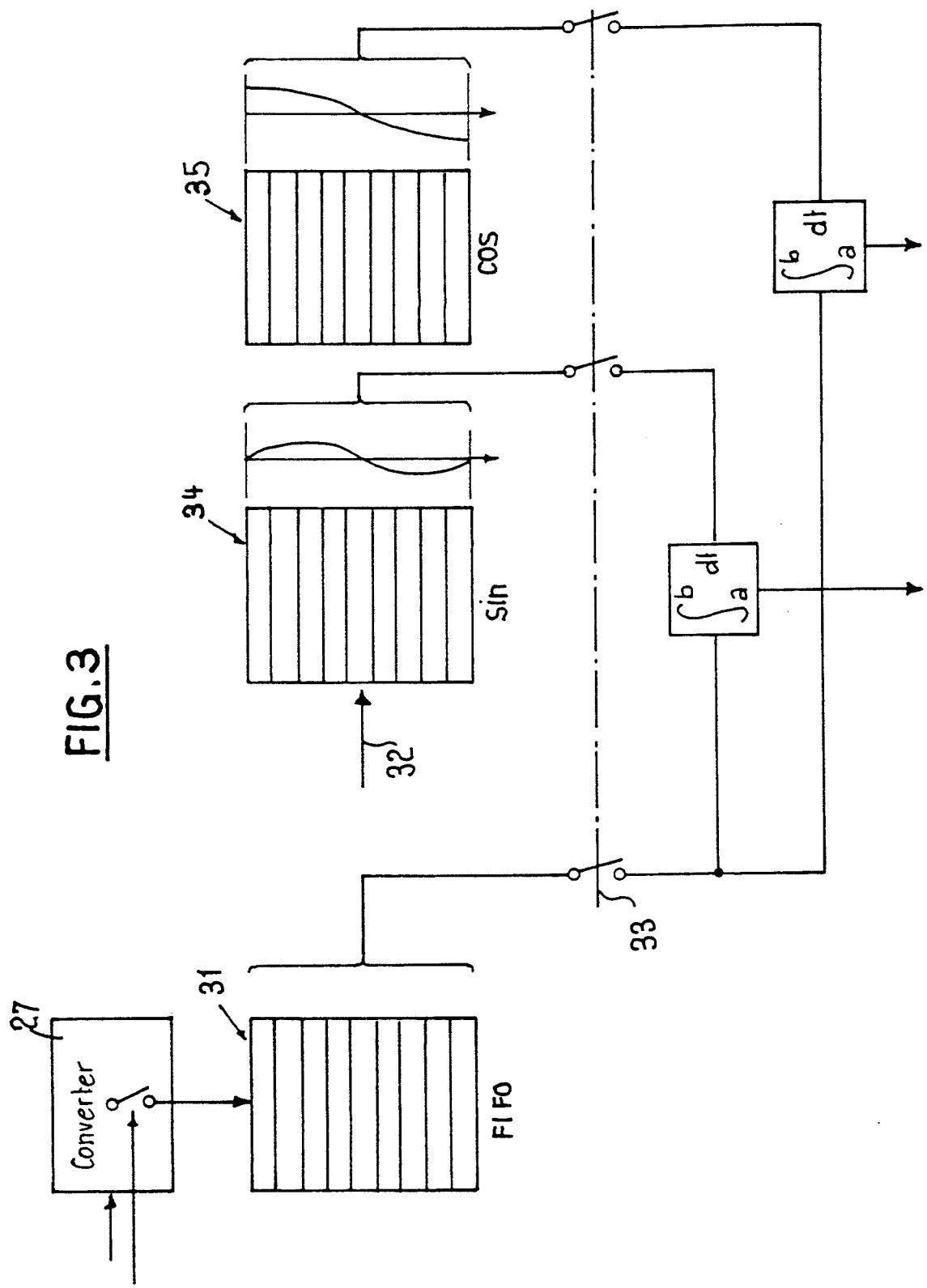
FIG. 3 schematically illustrates displaceable tables containing sine and cosine values.

As illustrated in FIG. 3, for each pulse of the converter 27 a new value is introduced in the FIFO (First in First Out) 31 and at the same time the indicated start pointer 32 is incremented. For each pulse delivered by the internal evaluation sampler 33 (e.g. a time interrupt in the processor) the following discrete correlation integral is calculated:

$$\sum_{i=1}^{9} FIFO(i) * \text{look-up table}(i + \text{pointer})$$

This correlation integral is practically the desired multiplication result. During the execution of this computation the sin/cos tables must be considered as closed, which means that the first value is processed after the last value. It is clear that no synchronization of the evaluation sampling rate 33 with any other frequency is necessary and that at the same time an enhancement of approximately 8 bits, i.e. 15 dB, in the dynamic range of the input signal is achieved, in comparison to the known sampling techniques.

Figure 4:
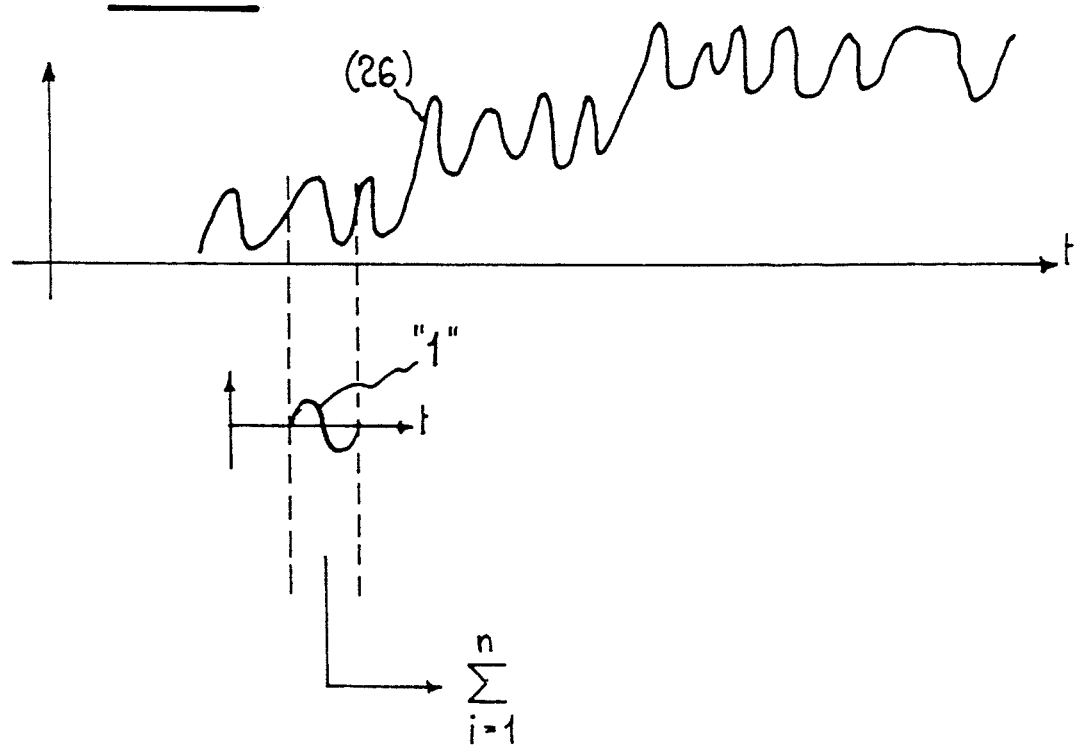
FIG. 4 is an example of the operation of the present invention.

A further improvement of the data recognition can be achieved by replacing the sampler 6, 7 with a further discrete correlation integral calculation (FIG. 4). In accordance with this new proceeding, a sample pattern of the signal shape of an ideal "1" or "0" is preprogrammed in a read only memory. In the present case a sine cycle because of the very sharp digital filters 20 and 23, is correlated with the demodulated signal according to the formula:

$$\sum_{i=1}^{n} \text{output}_{26}(i + T_0) * \text{table}(i)$$

where $T_o$ is the start pointer of the bit to be evaluated.

When the signal more closely resembles a "1" than a "0", one gets a positive result, or a negative result in the opposite case. If a dead window is provided while evaluating the result of the integral, the effect of the noise is practically eliminated (ideal value = $\pm \sigma$ wherein $\sigma$ is the variance of the noise) in that a value falling into the window is evaluated as an error. This correlation process compensates for the possibly arising phase jumps caused by faulty operation of the clock extractor inside the transponder (loss of a clock cycle, while operating at high distances). FIG. 4 shows the output signal (26) of the subtraction circuit 26 and illustrates (see symbol "1") the pattern for an ideal "1".

I claim:

1. A system for transmitting phase modulated at a comprising:

an inquiry unit in the form of an emitter-receiver and
a transponder arranged as a receiver-emitter such that a transmission of data takes place in at least one direction between said inquiry unit and said transponder, said transponder including a phase modulated emitter controlled by initial data, said phase modulated emitter acting on a signal derived from a carrier emitter by said inquiry unit,
and a phase demodulator wherein said phase demodulator comprises inputs for receiving a phase modulated signal transmitted by said transponder to said emitter-receiver and for receiving an unmodulated reference signal derived from said carrier and processor means for recovering a sequence of said initial data from said phase modulated signal and from said unmodulated reference signal independently of a carrier phase shift $\mu$ between said reference signal and the carrier component of said phase modulated signal, wherein, said phase demodulator comprises a first stage yielding the raw real and imaginary components of the phase modulation of said phase modulated signal and means for the correction of said carrier phase shift $\mu$ of said phase modulation, and said processor means recovers said data by determining axis rotation according to the equations:

$$X = x\cos\mu + y\sin\mu, \text{ or}$$

$$Y = y\cos\mu - x\sin\mu,$$

wherein x is the raw real component, y is the raw imaginary component, Y is the imaginary component, and X is the real component of said phase modulation.

2. A system according to claim 1, characterized in that sine and cosine of said carrier phase shift $\mu$ is determined continuously from the raw real (x) and imaginary (y) phase modulation components by use of low pass filters.

3. The system of claim 1 or 2, wherein the phase modulated signal frequency of the inquiry unit is evaluated independently of its position of phase in the demodulator, without feedback and with a negligible delay in comparison with the total time necessary for data transfer.

4. The system of claim 1, wherein a pair of signals constituting said unmodulated reference signal and the phase modulated signal are each delivered to the inputs of a first and second multiplier, and wherein the output of each of said first and second multipliers is connected with the inputs of first and second low pass filters where said first and second low pass filters have different cut off frequencies, and output signals of each of the low pass filters with the lower cut off frequency are mixed with output signals of the low pass filter with the higher cut off frequency by one of a third or fourth multiplier, wherein outputs of said third and fourth multipliers are added or subtracted in order to recover the demodulated data.

5. The system of claim 4, wherein the first and second multipliers comprise processor means which scan the phase modulated signal with an input scan rate and performs a multiplication asynchronous with an evaluation scan rate by using tables containing sine and cosine values, and wherein the ratio between said input scan rate and said evaluation scan rate is a number greater than one.

6. The system of claim 1, wherein sampling and evaluation of individual bits of data is achieved by discrete correlation integrals between the demodulated signal and a model signal representing an ideal "1" or "0".

7. The apparatus of claim 1, wherein said processor means recovers said data by calculating only one of said phase modulations, X or Y.

8. The apparatus of claim 1 wherein said phase demodulator further comprises means for multiplying said real and imaginary components of said phase modulated signal by signals corresponding to said unmodulated reference signal, and low pass filter means for filtering signals output from said means for multiplying, whereby a signal representing said carrier phase shift $\mu$ may be obtained.

9. The apparatus of claim 8, wherein the phase modulated signal frequency of the inquiry unit is evaluated independently of its position of phase in the demodulator, without feedback and with a negligible delay in comparison with the total time necessary for data transfer.

* * * * *